(12) United States Patent
Kalia et al.

(10) Patent No.: US 11,586,812 B2
(45) Date of Patent: Feb. 21, 2023

(54) UNSUPERVISED GENERATION OF RULES FOR AN ADAPTER GRAMMAR

(71) Applicant: International Business Machines Corporation, Armonk, NY (US)

(72) Inventors: Anup Kalia, Elmsford, NY (US); Chen Lin, Elmsford, NY (US); Jin Xiao, White Plains, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 16/671,047

(22) Filed: Oct. 31, 2019

(65) Prior Publication Data
US 2021/0133284 A1    May 6, 2021

(51) Int. Cl.
| | | |
|---|---|---|
| G06F 40/211 | (2020.01) | |
| G06N 20/00 | (2019.01) | |
| G06K 9/62 | (2022.01) | |
| G06V 30/414 | (2022.01) | |

(52) U.S. Cl.
CPC .......... *G06F 40/211* (2020.01); *G06K 9/6267* (2013.01); *G06N 20/00* (2019.01); *G06V 30/414* (2022.01)

(58) Field of Classification Search
CPC .... G06F 40/211; G06K 9/6267; G06N 20/00; G06V 30/414
See application file for complete search history.

(56) References Cited

U.S. PATENT DOCUMENTS

| | | | |
|---|---|---|---|
| 7,299,180 B2 | 11/2007 | Wang et al. | |
| 7,403,891 B2 | 7/2008 | Park et al. | |
| 7,761,437 B2 | 7/2010 | Tsuzuki et al. | |
| 8,752,001 B2 | 6/2014 | Sureka et al. | |
| 9,594,831 B2 | 3/2017 | Wang et al. | |
| 10,002,123 B2 | 6/2018 | Whitman et al. | |
| 2002/0194230 A1* | 12/2002 | Polanyi ................. | G06F 40/289 707/E17.094 |
| 2005/0049852 A1* | 3/2005 | Chao ....................... | G06F 40/30 704/9 |
| 2013/0024440 A1* | 1/2013 | Dimassimo ........... | G06F 16/951 707/706 |

(Continued)

OTHER PUBLICATIONS

Mark Johnson, Sharon Goldwater, Tom Griffiths, Learning rules with Adaptor Grammars, 2009 (Year: 2009).*

(Continued)

*Primary Examiner* — Mark Villena
(74) *Attorney, Agent, or Firm* — Sherman IP LLP; Kenneth L. Sherman; Hemavathy Perumal

(57) ABSTRACT

One embodiment of the invention provides a method for entity extraction, comprising determining a set of part-of-speech (POS) tags based on one or more documents, determining a concept in the one or more documents based on the set of POS tags, and extracting one or more phrases from the one or more documents based on the concept. The method further comprises generating a first set of rules corresponding to the concept based on the one or more phrases, generating a second set of rules specific to a domain based on the first set of rules, and learning, via an adapter grammar, a structure of one or more named entities in the one or more documents based on the second set of rules.

21 Claims, 6 Drawing Sheets

(56) References Cited

U.S. PATENT DOCUMENTS

| | | | |
|---|---|---|---|
| 2015/0106078 A1* | 4/2015 | Chang | G06F 16/35 |
| | | | 704/9 |
| 2015/0106156 A1* | 4/2015 | Chang | G06Q 30/0201 |
| | | | 705/7.29 |
| 2016/0078014 A1* | 3/2016 | Avasarala | G06F 40/169 |
| | | | 704/9 |
| 2016/0188568 A1* | 6/2016 | Srinivasan | G06F 40/30 |
| | | | 704/9 |
| 2017/0132529 A1 | 5/2017 | Zhang et al. | |
| 2019/0087463 A1* | 3/2019 | Dua | G06F 16/93 |
| 2020/0106876 A1* | 4/2020 | Keen | G06Q 10/107 |
| 2020/0111023 A1* | 4/2020 | Pondicherry Murugappan | |
| | | | G06Q 10/0631 |
| 2021/0004441 A1* | 1/2021 | Sapugay | G06F 40/295 |

OTHER PUBLICATIONS

Weiwei Guo, Qi Li, Yuening Hu, Zornista Kozareva, Ke Zhai, Query to Knowledge: Unsupervised Entity Extraction from Shopping Queries using Adaptor Grammars, 2016 (Year: 2016).*

Elsner, M. et al., "Structured Generative Models for Unsupervised Named-Entity Clustering," Proceedings of Human Language Technologies: The 2009 Annual Conference of the North American Chapter of the ACL, Jun. 2009, pp. 164-172, United States.

Etzioni, O. et al., "Unsupervised Named-Entity Extraction from the Web: An Experimental Study," Artificial Intelligence, 165(1), Jun. 1, 2005, pp. 91-134, United States.

Johnson, M., "PCFGs, Topic Models, Adaptor Grammars and Learning Topical Collocations and the Structure of Proper Names," Proceedings of the 48th Annual Meeting of the Association for Computational Linguistics, Jul. 4, 2010, pp. 1-29, Macquarie University, Australia.

Krishnan, A. et al., "Unsupervised Concept Categorization and Extraction from Scientific Document Titles," Proceedings of the 2017 ACM on Conference on Information and Knowledge Management, Nov. 6, 2017, pp. 1399-1348, ACM, New York, United States {Abstract Only}.

Zhai, K., et al., "Query to Knowledge: Unsupervised Entity Extraction from Shopping Queries using Adaptor Grammars," Proceedings of the 39th International ACM SIGIR conference on Research and Development in Information Retrieval, Jul. 7, 2016, pp. 255-264, ACM, United States.

Mell et al., "The NIST Definition of Cloud Computing," National Institute of Standards and Technology Special Publication 800-145, Sep. 2011, 7 pages.

Wong, S. et al., "Exploring adaptor grammars for native language identification", Proceedings of the 2012 Joint Conference on Empirical Methods in Natural Language Processing and Computational Natural Language Learning, Jul. 12-14, 2012, pp. 699-709, Jeju Island, Korea.

Service Now, "Digital workflows for enterprise—Make work, work better", downloaded at https://www.servicenow.com/, downloaded Oct. 31, 2019, 11 pages, United States.

IBM, "IBM Control Desk on Cloud", downloaded: https://www.ibm.com/us-en/marketplace/it-service-management, downloaded Oct. 31, 2019, 5 pages, United Stands.

* cited by examiner

UNSUPERVISED GENERATION OF RULES FOR AN ADAPTER GRAMMAR

BACKGROUND

Embodiments of the invention generally relate to entity extraction in natural language processing, and more specifically, to a method and system for unsupervised generation of rules for an adapter grammar.

SUMMARY

One embodiment of the invention provides a method for entity extraction, comprising determining a set of part-of-speech (POS) tags based on one or more documents, determining a concept in the one or more documents based on the set of POS tags, and extracting one or more phrases from the one or more documents based on the concept. The method further comprises generating a first set of rules corresponding to the concept based on the one or more phrases, generating a second set of rules specific to a domain based on the first set of rules, and learning, via an adapter grammar, a structure of one or more named entities in the one or more documents based on the second set of rules.

Another embodiment of the invention provides a system for entity extraction, comprising at least one processor and a non-transitory processor-readable memory device storing instructions that when executed by the at least one processor causes the at least one processor to perform operations. The operations include determining a set of POS tags based on one or more documents, determining a concept in the one or more documents based on the set of POS tags, and extracting one or more phrases from the one or more documents based on the concept. The operations further include generating a first set of rules corresponding to the concept based on the one or more phrases, generating a second set of rules specific to a domain based on the first set of rules, and learning, via an adapter grammar, a structure of one or more named entities in the one or more documents based on the second set of rules.

One embodiment of the invention provides a computer program product for entity extraction, comprising a computer readable storage medium having program instructions embodied therewith. The program instructions are executable by a processor to cause the processor to determine a set of POS tags based on one or more documents, determine a concept in the one or more documents based on the set of POS tags, and extract one or more phrases from the one or more documents based on the concept. The program instructions are executable by the processor to further cause the processor to generate a first set of rules corresponding to the concept based on the one or more phrases, generate a second set of rules specific to a domain based on the first set of rules, and learn, via an adapter grammar, a structure of one or more named entities in the one or more documents based on the second set of rules.

Another embodiment provides a method for entity extraction, comprising receiving historical data, learning a set of rules for an adapter grammar from the historical data, and providing the set of rules to the adapter grammar to extract one or more named entities from a corpus.

One embodiment provides a method for entity extraction, comprising receiving a set of documents, generating a set of domain-specific rules for an adapter grammar based on the set of documents, and providing the set of domain-specific rules to the adapter grammar to learn and extract one or more named entities from the set of documents.

These and other aspects, features and advantages of embodiments of the invention will be understood with reference to the drawing figures, and detailed description herein, and will be realized by means of the various elements and combinations particularly pointed out in the appended claims. It is to be understood that both the foregoing general description and the following brief description of the drawings and detailed description of embodiments of the invention are exemplary and explanatory of preferred embodiments of the invention, and are not restrictive of embodiments of the invention, as claimed.

BRIEF DESCRIPTION OF THE DRAWINGS

The subject matter which is regarded as embodiments of the invention are particularly pointed out and distinctly claimed in the claims at the conclusion of the specification. The foregoing and other objects, features, and advantages of embodiments of the invention are apparent from the following detailed description taken in conjunction with the accompanying drawings in which:

Figure 1:
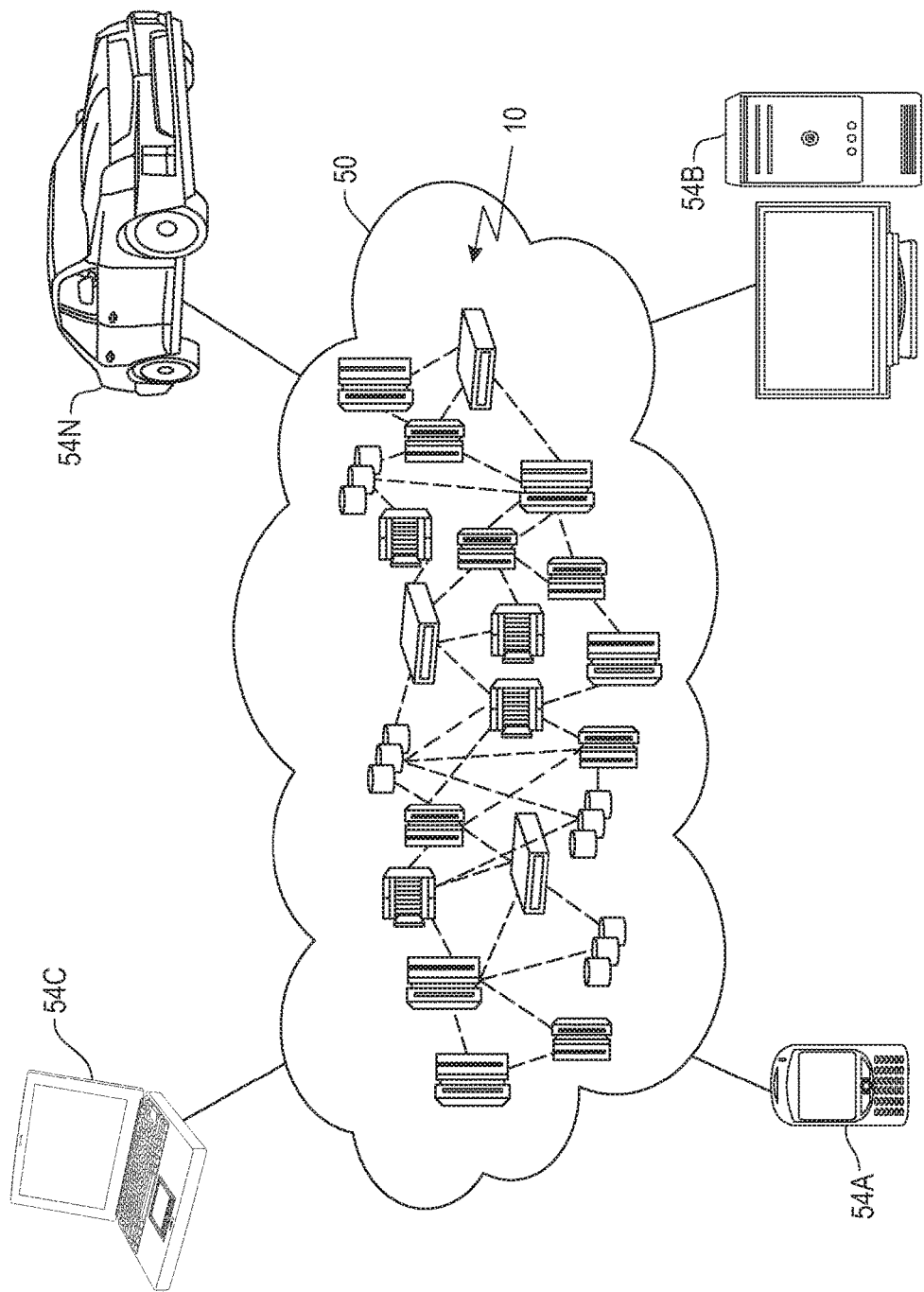
FIG. 1 depicts a cloud computing environment according to an embodiment of the present invention.

The detailed description explains the preferred embodiments of the invention, together with advantages and features, by way of example with reference to the drawings.

DETAILED DESCRIPTION

Embodiments of the invention generally relate to entity extraction in natural language processing, and more specifically, to a method and system for unsupervised generation of rules for an adapter grammar. One embodiment of the invention provides a method for entity extraction, comprising determining a set of part-of-speech (POS) tags based on one or more documents, determining a concept in the one or more documents based on the set of POS tags, and extracting one or more phrases from the one or more documents based on the concept. The method further comprises generating a first set of rules corresponding to the concept based on the one or more phrases, generating a second set of rules specific to a domain based on the first set of rules, and learning, via an adapter grammar, a structure of one or more named entities in the one or more documents based on the second set of rules.

Another embodiment of the invention provides a system for entity extraction, comprising at least one processor and a non-transitory processor-readable memory device storing instructions that when executed by the at least one processor causes the at least one processor to perform operations. The operations include determining a set of POS tags based on one or more documents, determining a concept in the one or more documents based on the set of POS tags, and extracting one or more phrases from the one or more documents based on the concept. The operations further include generating a first set of rules corresponding to the concept based on the one or more phrases, generating a second set of rules specific to a domain based on the first set of rules, and learning, via an adapter grammar, a structure of one or more named entities in the one or more documents based on the second set of rules.

One embodiment of the invention provides a computer program product for entity extraction, comprising a computer readable storage medium having program instructions embodied therewith. The program instructions are executable by a processor to cause the processor to determine a set of POS tags based on one or more documents, determine a concept in the one or more documents based on the set of POS tags, and extract one or more phrases from the one or more documents based on the concept. The program instructions are executable by the processor to further cause the processor to generate a first set of rules corresponding to the concept based on the one or more phrases, generate a second set of rules specific to a domain based on the first set of rules, and learn, via an adapter grammar, a structure of one or more named entities in the one or more documents based on the second set of rules.

Another embodiment provides a method for entity extraction, comprising receiving historical data, learning a set of rules for an adapter grammar from the historical data, and providing the set of rules to the adapter grammar to extract one or more named entities from a corpus.

One embodiment provides a method for entity extraction, comprising receiving a set of documents, generating a set of domain-specific rules for an adapter grammar based on the set of documents, and providing the set of domain-specific rules to the adapter grammar to learn and extract one or more named entities from the set of documents.

For expository purposes, the term "document" generally refers to any type of document comprising text. Examples of documents include, but are not limited to, information technology (IT) documents relating to one or more IT areas (e.g., services, database, storage, hardware, etc.), legal documents, intellectual property (IP) documents, healthcare documents, review documents, text publications, corporate documents, etc.

Examples of IT documents include, but are not limited to, tickets, logs, issues related to Git (a control system for tracking changes in source code during software development), etc. Examples of legal documents include, but are not limited to, agreements, contracts, deeds, wills, certificates, bills of sale, legislative acts, etc. Examples of IP documents include, but are not limited to, patent registrations, trademark registrations, copyright registrations, and any type of legal document relating to protection of IP, such as non-disclosure agreements, license agreements, etc. Examples of healthcare documents include, but are not limited to, medical records, billing records, health care directives, etc. Examples of review documents include, but are not limited to, reviews of publications (e.g., books), services (e.g., restaurants), companies (e.g., retail stores), products (e.g., cars), performances (e.g., movies), events (e.g., concerts), etc. Examples of text publications include, but are not limited to, newspapers, journals, scientific articles, books, white papers, encyclopedias, etc. Examples of corporate documents include, but are not limited to, meeting minutes, articles of incorporation, corporate bylaws, employee documents, etc.

For expository purposes, the terms "named entity recognition" and "entity extraction" generally refer to a process involving extracting one or more named entities from an unstructured text corpus comprising one or more documents.

Each word in a corpus has a corresponding POS tag that is based on its context and definition. POS tagging is the process of classifying words in a corpus into their parts of speech and labelling them accordingly (i.e., labelling each word with a corresponding POS tag). Examples of POS tags include, but are not limited to, 'VB' denoting a verb (base form), 'NN' denoting a noun (singular noun or mass noun), IF denoting an adjective, 'VBP' denoting a verb (non-third person singular present), 'CC' denoting a coordinating conjunction, 'NNS' denoting a noun (plural), 'PRP' denoting a personal pronoun, etc.

A named entity is a proper noun. Examples of named entities include, but are not limited to, concepts and instance entities such as artist names, song titles, business names, etc.

A context-free grammar (CFG) is a set of production rules that describe all possible strings in a given formal language. A probabilistic context free grammar (PCFG) is a probabilistic version of a CFG where each production rule has a probability. Let G generally denote a tuple defining a PCFG, wherein G=(N, W, R, S, theta), N is a set of non-terminals, W is a set of finite terminals, R is a set of PCFG rules, S is a start symbol, and theta is a set of probabilities associated with each rule in R (i.e., the set of PCFG rules R are probabilistic rules).

There are some limitations with PCFGs. For example, a PCFG assumes that a set of PCFG rules R generated from documents are predefined and ignores yield and structure of previously derived trees. For example, for a derivation tree "concept→language model" that recurs in different documents, a set of predefined PCFG rules R include: (1) a first PCFG rule defined as "Phrase→biterm language model" with a corresponding probability 0.09 (where biterm is a modifier and language model is a concept), and (2) a second PCFG rule "Phrase→time based language model" with a corresponding probability 0.02 (where time based is a modifier and language model is a concept).

The terms "adapter grammar" and "adaptor grammar" are used interchangeably in the specification.

Adapter grammars are non-parametric extensions/versions of PCFGs. Adapter grammars are a class of probabilistic models that generalize PCFGs. Specifically, an adapter grammar is a non-parametric, unsupervised model that augments PCFG rules R generated from documents with adaptors that can capture/induce dependencies among successive parses, thereby removing the assumption that the PCFG rules R are predefined and ignores yield and structure of previously derived trees. Unlike parametric models for which a fixed number of parameters are specified in advance, non-parametric models can grow to a size best suited to observed data. An adaptor grammar is a PCFG where a subset of non-terminals from documents are adapted; the adapter grammar learns meaningful parse trees for each adapted non-terminal from the documents based on Pitman-Yor process (i.e., learns new language substructures or structures of named entities in the documents). Adaptor grammars learn probability of entire subtrees (i.e., how a non-terminal expands to terminals).

For expository purposes, the term "adapter grammar rules" generally refers to rules for an adapter grammar used for entity extraction. Adapter grammar rules comprise probabilistic rules of a PCFG that have been augmented to capture/induce dependencies among successive parses.

Conventional unsupervised approaches to extract named entities from documents are based on adapter grammar. Creation of adapter grammar rules rely on domain knowledge and heuristics. For example, adapter grammar rules may be created in adhoc or created using heuristics. There is no existing methodology that can take documents as input and automatically generate adapter grammar rules in an unsupervised manner.

Embodiments of the invention provide a method and system configured to receive, as input, documents, and automatically generate domain-specific adapter grammar rules based on the documents. The resulting adapter grammar rules can be provided as input to an adapter grammar to extract/generate named entities from documents. For example, if the input comprises IT documents from different technology areas (e.g., database, storage, hardware, etc.), the resulting adapter grammar rules can be provided as input to an adapter grammar to extract/generate named entities from IT documents for the purpose of discovering application dependencies, configurations, resources, and instance names, thereby providing support for application analytics and automation in instances where relevant structured data (e.g., application registry, configuration management database (CMDB), etc.) is missing or incomplete.

Embodiments of an invention provide an unsupervised and automatic approach for generating adapter grammar rules. This approach does not require prior information on named entities and their corresponding categories/key concepts (e.g., prior labels, a prior database, etc.). Instead, this approach includes learning the adapter grammar rules from historical data (i.e., named entity structure learning). For example, in one embodiment, the learning comprising identifying categories/key concepts in the historical data, extracting phrases from the historical data, generating a PCFG from the extracted phrases, compressing the PCFG, and generating the adapter grammar rules based on the compressed PCFG. The adapter grammar rules can be fed to an adapter grammar to extract named entities associated with the identified categories/key concepts. For example, if the historical data comprises IT documents from different technology areas (e.g., database, storage, hardware, etc.), the extracted named entities can be used for application discovery, application analytics, and application automation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. In one embodiment, this cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants).

Resource pooling: the provider's computing resources are pooled to serve multiple consumers using a multi-tenant model, with different physical and virtual resources dynamically assigned and reassigned according to demand. In one embodiment, there is a sense of location independence in that the consumer generally has no control or knowledge over the exact location of the provided resources but is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one embodiment, it is managed by the organization or a third party and exists on-premises or off-premises.

Community cloud: the cloud infrastructure is shared by several organizations and supports a specific community that has shared concerns (e.g., mission, security requirements, policy, and compliance considerations). In one embodiment, it is managed by the organizations or a third party and exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

FIG. 1 depicts a cloud computing environment 50 according to an embodiment of the present invention. As shown, in one embodiment, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate. In one embodiment, nodes 10 communicate with one another. In one embodiment, they are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
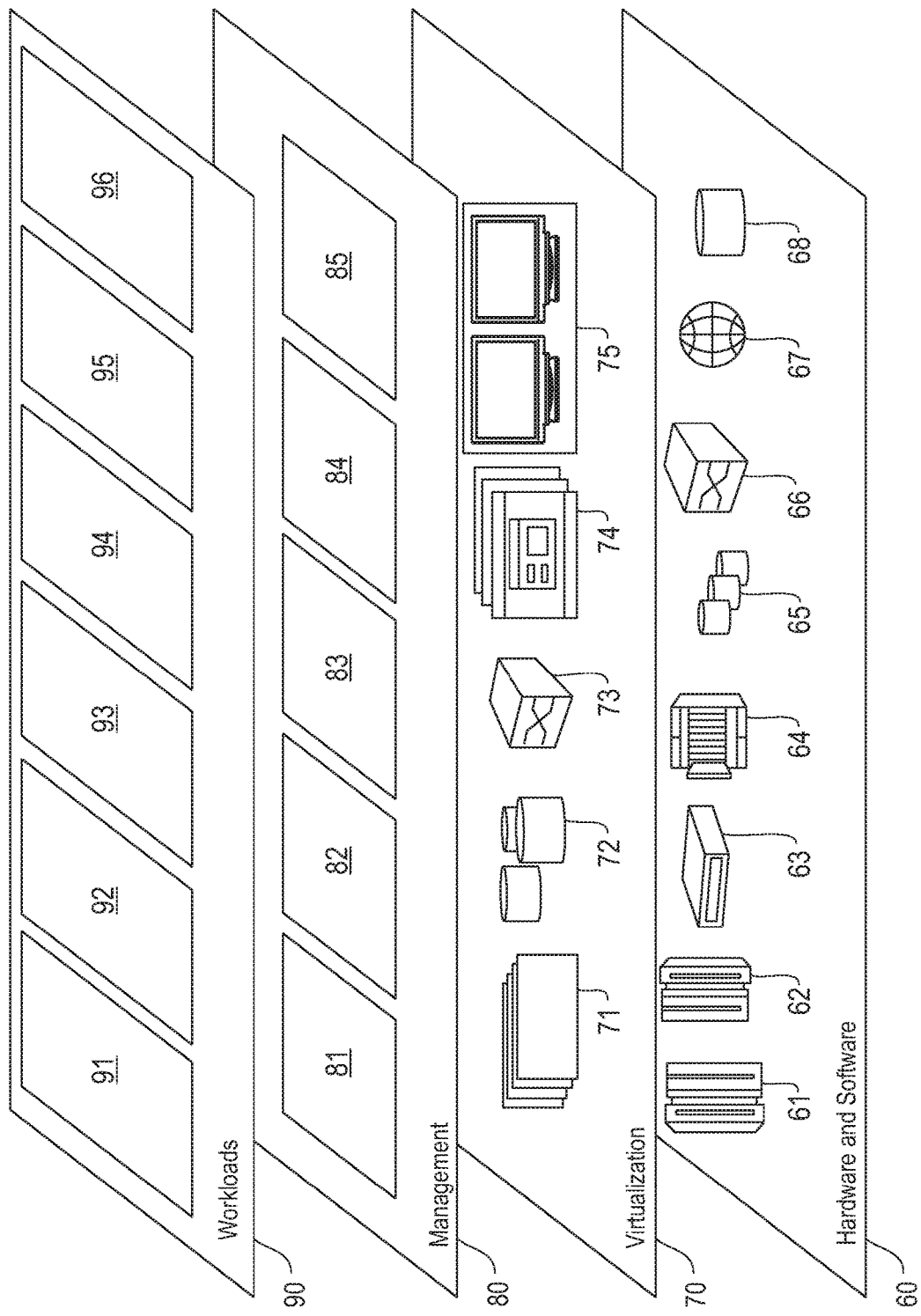
FIG. 2 depicts abstraction model layers according to an embodiment of the present invention.

FIG. 2 depicts a set of functional abstraction layers provided by cloud computing environment 50 according to an embodiment of the present invention. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

In one embodiment, virtualization layer 70 provides an abstraction layer from which the following examples of virtual entities are provided: virtual servers 71; virtual storage 72; virtual networks 73, including virtual private networks; virtual applications and operating systems 74; and virtual clients 75.

In one embodiment, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one embodiment, these resources include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

In one embodiment, workloads layer 90 provides examples of functionality for which the cloud computing environment is utilized. In one embodiment, examples of workloads and functions which are provided from this layer include: mapping and navigation 91; software development and lifecycle management 92; virtual classroom education delivery 93; data analytics processing 94; transaction processing 95; and unsupervised adapter grammar rules generation 96 (e.g., an unsupervised adapter grammar rules generation system 330, as described in detail later herein).

Figure 3:
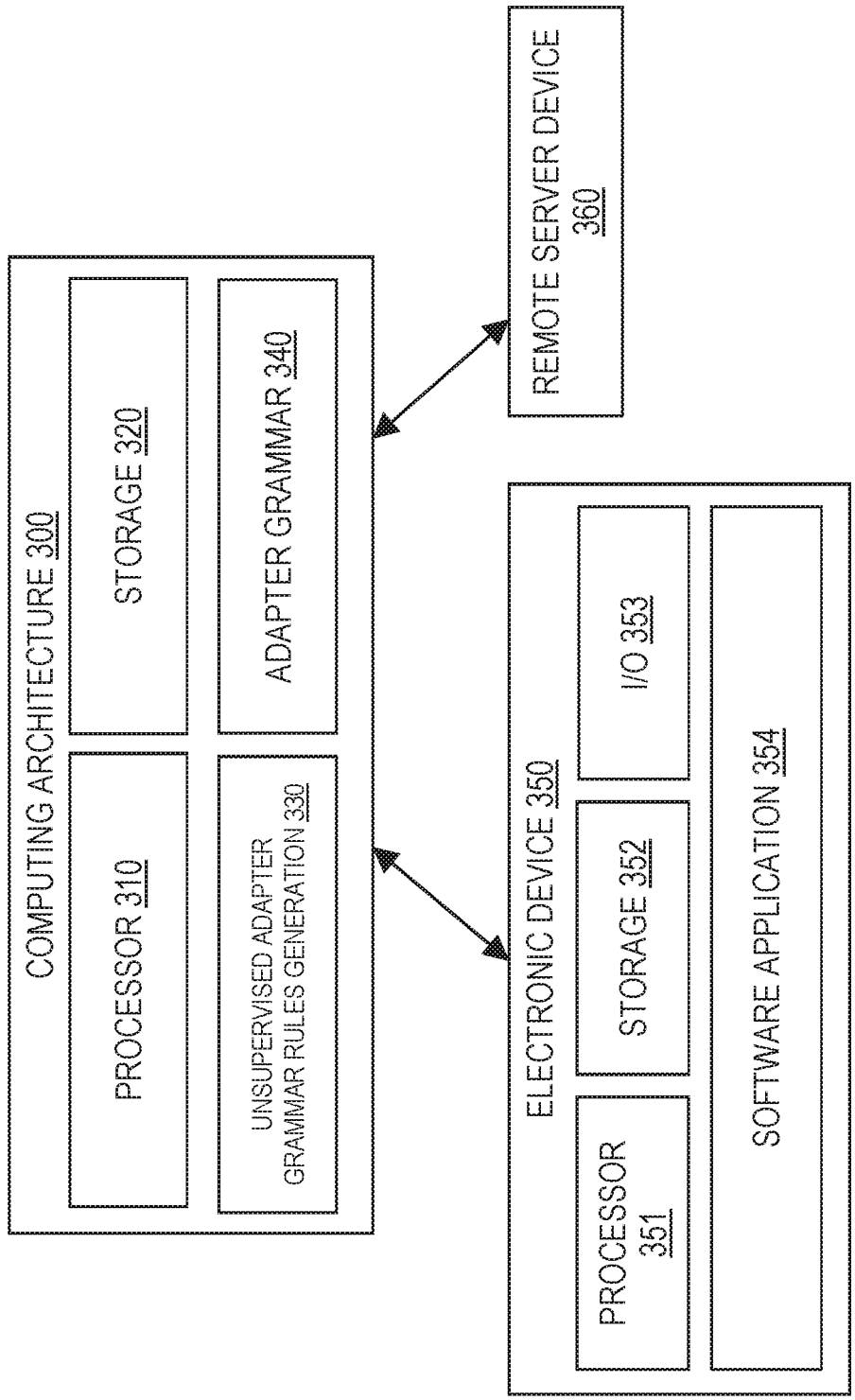
FIG. 3 illustrates an example computing architecture for implementing unsupervised adapter grammar rules generation, in accordance with an embodiment of the invention.

FIG. 3 illustrates an example computing architecture 300 for implementing unsupervised adapter grammar rules generation, in accordance with an embodiment of the invention. In one embodiment, the computing architecture 300 is a centralized computing architecture. In another embodiment, the computing architecture 300 is a distributed computing architecture.

In one embodiment, the computing architecture 300 comprises computation resources such as, but not limited to, one or more processor units 310 and one or more storage units 320. One or more applications may execute/operate on the computing architecture 300 utilizing the computation resources of the computing architecture 300. In one embodiment, the applications on the computing architecture 300 include, but are not limited to, the following: (1) an unsupervised adapter grammar rules generation system 330 configured for unsupervised automatic generation of adapter grammar rules, and (2) an adapter grammar 340 configured for entity extraction. For example, the unsupervised adapter grammar rules generation system 330 can be used to learn adapter grammar rules for the adapter grammar 340 from historical data. The adapter grammar rules can then be provided as input to the adapter grammar 340 for extraction of named entities from a corpus comprising one or more documents. For example, if the historical data comprises IT documents from different technology areas (e.g., database, storage, hardware, etc.), the extracted named entities can be used for application discovery, application analytics, and application automation.

In one embodiment, the unsupervised adapter grammar rules generation system 330 and/or the adapter grammar 340 is configured to exchange data with one or more electronic devices 350 and/or one or more remote server devices 360 over a connection (e.g., a wireless connection such as a Wi-Fi connection or a cellular data connection, a wired connection, or a combination of the two).

In one embodiment, an electronic device 350 comprises one or more computation resources such as, but not limited to, one or more processor units 351 and one or more storage units 352. One or more applications may execute/operate on an electronic device 350 utilizing the one or more computation resources of the electronic device 350 such as, but not limited to, one or more software applications 354 loaded onto or downloaded to the electronic device 350. Examples of software applications 354 include, but are not limited to, artificial intelligence (AI) applications, natural language processing (NLP) applications, etc.

Examples of an electronic device 350 include, but are not limited to, a desktop computer, a mobile electronic device (e.g., a tablet, a smart phone, a laptop, etc.), a wearable device (e.g., a smart watch, etc.), an Internet of Things (IoT) device, a smart appliance such as a smart television, etc.

In one embodiment, an electronic device 350 comprises one or more input/output (I/O) units 353 integrated in or coupled to the electronic device 350, such as a keyboard, a keypad, a touch interface, a display screen, etc. A user may utilize an I/O module 353 of an electronic device 350 to configure one or more user preferences, configure one or more parameters (e.g., validation properties, thresholds, etc.), provide input, etc.

In one embodiment, an electronic device 350 and/or a remote server device 360 may be a source of historical data and/or a document.

In one embodiment, the unsupervised adapter grammar rules generation system 330 and/or the adapter grammar 340 may be accessed or utilized by one or more online services (e.g., AI services, NLP services) hosted on a remote server device 360 and/or one or more software applications 354 (e.g., AI applications, NLP applications) operating on an electronic device 350. For example, in one embodiment, a virtual assistant, a search engine, or another type of software application 354 operating on an electronic device 350 invokes the system 330 to perform application discovery, application analytics, application automation, etc.

Figure 4:
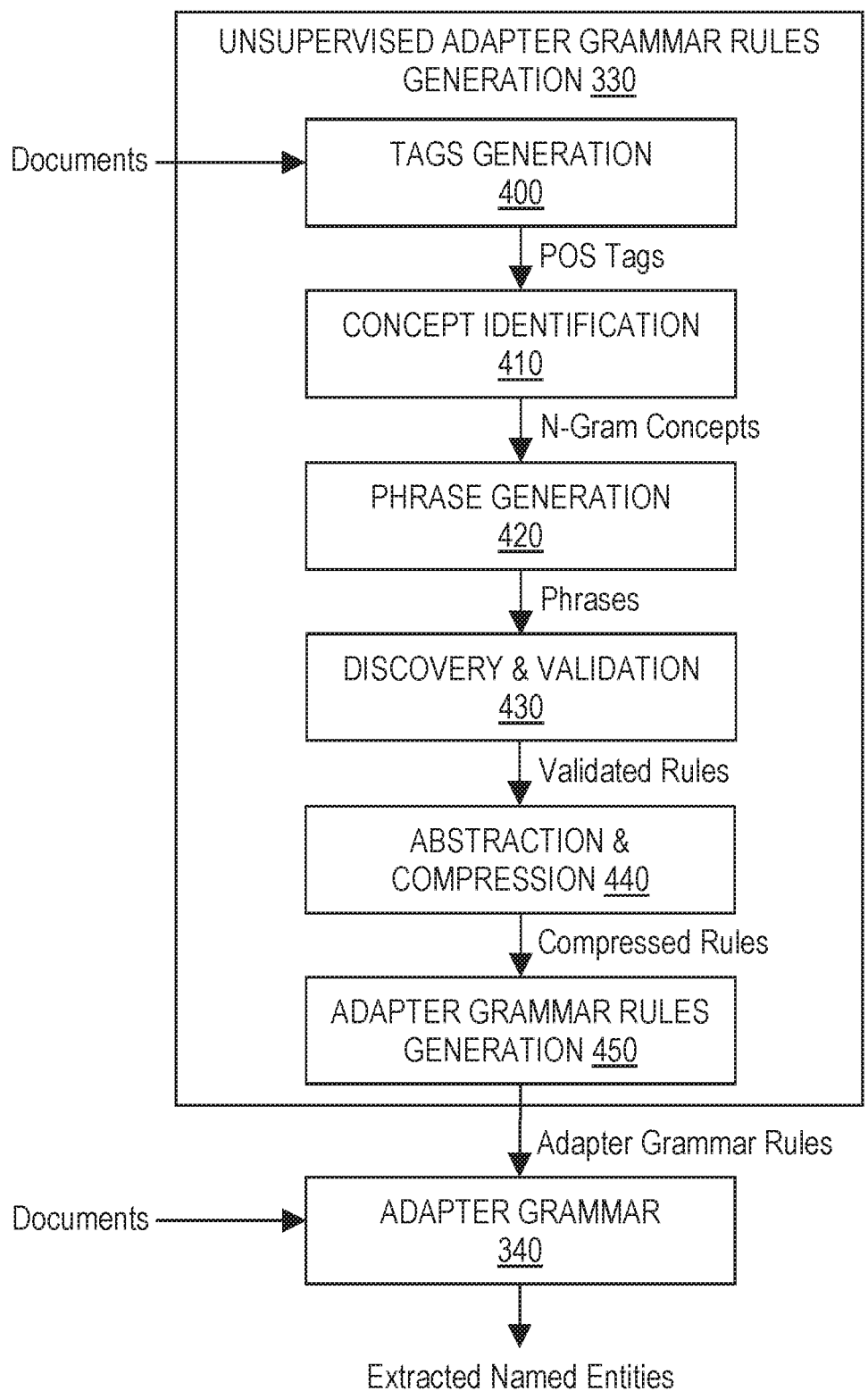
FIG. 4 illustrates an example unsupervised adapter grammar rules generation system, in accordance with an embodiment of the invention.

FIG. 4 illustrates an example unsupervised adapter grammar rules generation system 330, in accordance with an embodiment of the invention. In one embodiment, the system 330 comprises a tags generation unit 400 configured to: (1) receive a corpus comprising one or more documents, and (2) for each word included in the documents, determining a corresponding POS tag with the highest probability (i.e., likelihood) of the word being classified with the POS tag (i.e., the word is most likely to be classified and labeled with the POS tag in POS tagging; the word is most likely to be associated with the POS tag compared to any other POS tag). In one embodiment, the tags generation unit 400 determines, for a word included in a corpus, a corresponding POS tag with the highest probability by: (1) determining a distribution of POS tags for the word across the corpus, wherein the distribution identifies one or more candidate POS tags corresponding to the word and their probabilities, and (2) based on the distribution, selecting a candidate POS tag with the highest probability among the one or more candidate POS tags, wherein the candidate POS tag selected is provided as the corresponding POS tag with the highest probability.

For example, some of the words included in the documents may have ambiguity in terms of POS tags. Table 1 below provides some example words included in a given set of documents that have multiple POS tags.

TABLE 1

| Word | POS Tags |
|---|---|
| Unix | NN, JJ |
| Replace | VB, VBP |
| Feature | VBP, NN |
| Debug | VB, NN |

In one embodiment, the tags generation unit 400 determines, for a word included in a corpus, a corresponding POS tag with the highest probability by learning the POS tag from the corpus using a PCFG. Specifically, for each word included in a given set of documents, the tags generation unit 400 determines a corresponding POS tag with the highest probability by: (1) generating a set of parse trees corresponding to the word based on the documents, (2) generating a PCFG corresponding to the word based on the parse trees (e.g., using the Natural Language Toolkit (NLTK) library for NLP), (3) generating an inverted index (i.e., distribution of POS tags) corresponding to the word based on the parse trees, wherein the inverted index identifies one or more candidate POS tags corresponding to the word and their probabilities, and (4) based on the inverted index, selecting a candidate POS tag with the highest probability among the one or more candidate POS tags, wherein the candidate POS tag selected is provided as the corresponding POS tag with the highest probability. In one embodiment, probabilities of candidate POS tags are learned from historical data.

For example, if a given set of documents comprises the words included in Table 1, the tags generation unit 400 generates a parse tree defined as "(ROOT (S (VP (VB stop) (CC and) (VB start) (NP (NN sql) (NNS services)))))". Table 2 below provides some example PCFG rules and their probabilities. The tags generation unit 400 generates the PCFG rules based on the parse tree defined above using the NLTK library.

TABLE 2

NN -> unix: 0.00005
JJ -> unix: 0.003

Table 3 below provides an example inverted index for the word "unix". The tags generation unit 400 generates the inverted index based on the parse tree defined above and the PCFG rules of Table 2.

TABLE 3 unix: {NN: 0.00005, JJ: 0.003}

Based on the inverted index for the word "unix", the tags generation unit 400 determines the POS tag is most likely to be associated with the word "unix" instead of the POS tag 'NN' as the probability that the word "unix" has as a POS tag is higher than the probability that the word "unix" has 'NN' as a POS tag. The tags generation unit 400 provides, for the word "unix", the POS tag as a corresponding POS tag with the highest probability.

In one embodiment, the system 330 comprises a concept identification unit 410 configured to extract/identify N-gram concepts from one or more documents, wherein N is a positive integer. In one embodiment, the N-gram concepts comprise at least one of the following: one or more unigram concepts (i.e., N=1), and one or more multigram concepts (i.e., N>1).

In one embodiment, the concept identification unit 410 is configured to extract/identify N-gram concepts from one or more documents by applying a page rank algorithm to the documents to generate one or more page ranks of words extracted from the documents.

Let k generally denote a size of a window for the page rank algorithm. For example, if a given sentence S included in the one or more documents comprises words $w_1$, $w_2$, $w_3$, $w_4$, and $w_5$ (i.e., S={$w_1$, $w_2$, $w_3$, $w_4$, and $w_5$}), and if k=4, the concept identification unit 410 computes/determines the following windows: (1) a first window $W_1$ comprising the words $w_2$, $w_3$, and $w_4$ (i.e., $W_1$={$w_1$, $w_2$, $w_3$, $w_4$}), and (2) a second window $W_2$ comprising the words $w_2$, $w_3$, $w_4$, and $w_5$ (i.e., $W_2$={$w_2$, $w_3$, $w_4$, $w_5$}). For each window, the concept identification unit 410 defines a corresponding graph comprising nodes and undirected edges, wherein each node is a word of the window, and each undirected edge connects any two nodes (i.e., words) of the graph. Let {$w_x$, $w_y$} generally denote an undirected edge connecting two words $w_x$ and $w_y$, wherein x and y are integers, and $x \neq y$. For example, for the first window $W_1$, the concept identification unit 410 defines a graph comprising the following undirected edges: {$w_1, w_2$}, {$w_3, w_4$}, {$w_1, w_3$}, {$w_2, w_3$}, {$w_1, w_4$}, and {$w_2, w_4$}.

Let $S(V_i)$ generally denote a weight of a node of a graph for a window. For each window, the concept identification unit 410 is configured to determine a weight $S(V_i)$ of each node i of a corresponding graph in accordance with equation (1) provided below:

$$S(V_i) = (1-d) + d * \sum_{j \in In(v_i)} \frac{1}{|Out(V_j)|} S(V_j), \quad (1)$$

wherein d is a dumping factor (in case of no outgoing edges), $In(V_i)$ is a set of incoming edges of node i, $Out(V_j)$ is a set of outgoing edges of node j, and $|Out(V_j)|$ is a number of outgoing edges of node j. For example, if a graph comprises nodes a, b, and e and undirected edges {a, e} and {b, e}, the concept identification unit 410 is configured to determine a weight $S(V_e)$ of the node e in accordance with equation (2) provided below:

$$S(V_e) = (1-d) + d*(S(V_a) + \tfrac{1}{2}S(V_b)) \quad (2).$$

The concept identification unit 410 determines, for each word included in the documents, one or more POS tags corresponding to the word based on one or more weights determined in accordance with equation (2). Each POS tag determined is either a common noun or a proper noun. A z-score is a number of standard deviations from a mean (e.g., population mean) that a data point (e.g., a raw score) is. In one embodiment, the concept identification unit 410 is configured to: (1) determine a z-score based on weights computed and POS tags determined, and (2) generate a filtered list of top-k N-gram concepts based on the z-score.

Table 4 below provides an example ranked list of extracted unigram concepts with their corresponding weights.

TABLE 4 service -- 131.54378564222785
services -- 73.79083118415122
server -- 20.27518372131835
request -- 19.985017382980036
prod -- 19.21410638043821
deployment -- 18.95257559213776

Each unigram concept of Table 4 that is underlined is included in a filtered list of extracted unigram concepts based on a z-score that is three standard deviations.

Table 5 below provides an example ranked list of extracted multigram concepts with their corresponding weights.

TABLE 5 service verizon -- 119
service accounts -- 83
service verizon wireless -- 81
service pack -- 61
service desk -- 43
network services -- 43
sql services -- 43
outlook services -- 41
service request -- 41

TABLE 5-continued services deployment -- 33
self service -- 31
services user -- 30
network services user -- 30

Each multigram concept of Table 5 that is underlined is included in a filtered list of extracted multigram concepts based on a z-score that is three standard deviations.

In one embodiment, the system 330 comprises a phrase generation unit 420 configured to: (1) receive one or more concepts (e.g., a filtered list of top-k N-gram concepts from the concept identification unit 410), and (2) for each concept, generate one or more phrases corresponding to the concept. In one embodiment, the phrase generation unit 420 generates noun phrases based on the concepts, wherein each noun phrase includes a noun and one or more other words, if any, that modify the noun (i.e., modifiers).

In one embodiment, for each concept, the phrase generation unit 420 generates at least one of the following: (1) a left phrase corresponding to the concept, wherein the left phrase comprises one or more words extracted from a left side of the concept, and (2) a right phrase corresponding to the concept, wherein the right phrase comprises one or more words extracted from a right side of the concept.

For example, if a document comprises the sentence "deploy synchmanager service to alm production server environment", and if a concept is "service", the phrase generation unit 420 generates a corresponding left phrase "synchmanager service" and a corresponding right phrase "service to alm production server environment". As another example, if a document comprises the sentence "dsc 5 10 tem activate new service verizon wireless jetpack 4g lte mobile hotspot ac7911", and if a concept is "service Verizon", the phrase generation unit 420 generates a corresponding left phrase "activate new service verizon" and a corresponding right phrase "service verizon wireless jetpack 4g lte mobile hotspot ac7911".

In one embodiment, the system 330 comprises a discovery and validation unit 430. For each concept (e.g., N-gram concepts from the concept identification unit 410), the discovery and validation unit 430 is configured to: (1) receive one or more phrases corresponding to the concept, (2) generate one or more parse trees corresponding to the concept based on the phrases, (3) generate a list of production rules corresponding to the concept based on the parse trees, and (4) generate a list of validated (i.e., valid) rules corresponding to the concept by eliminating/removing any production rule that cannot be used for entity extraction from the list of production rules, wherein each remaining (i.e., not eliminated/removed) production rule of the list of production rules is included as a validated rule in the list of validated rules.

In one embodiment, a list of rules (production rules or validated rules) generated by the discovery and validation unit 430 comprises at least one of the following: one or more rules for one or more left phrases corresponding to the concept ("left rules"), and one or more rules for one or more right phrases corresponding to the concept ("right rules").

In one embodiment, the discovery and validation unit 430 generates a list of production rules using PCFG. For example, for a concept "service" with a corresponding left phrase "synchmanager service" and a corresponding right phrase "service to alm production server environment", the discovery and validation unit 430 generates a left parse tree defined as "(ROOT (Phrase (NN synchmanager) (Concept service)))" and a right parse tree defined as "(ROOT (Phrase (Concept service) (TO to) (NN alm) (NN production) (NN server)))" based on the left phrase and the right phrase, respectively. The discovery and validation unit 430 generates a list of production rules based on the left parse tree and the right parse tree using PCFG.

Table 6 below provides some example production rules corresponding to the concept "service" and their probabilities, wherein the production rules are generated using PCFG.

TABLE 6

Phrase -> (NN, Concept): 0.0801687763713
Phrase -> (Concept, NN): 0.0580168776371
Phrase -> (NN, NN, Concept): 0.039029535865
Phrase -> (JJ, Concept): 0.0316455696203
Phrase -> (Concept, NN, NN): 0.0242616033755
Phrase -> (Concept, IN, NN): 0.0210970464135
Phrase -> (NN, NN, JJ, Concept): 0.0200421940928
Phrase -> (NN, NN, NN, Concept): 0.0147679324895
Phrase -> (DT, NN, Concept): 0.0137130801688
Phrase -> (JJ, NN, Concept): 0.0126582278481
Phrase -> (Concept, NN, IN): 0.0105485232068

In one embodiment, the discovery and validation unit 430 generates a list of validated rules based on one or more validation properties that define a validated rule. The validation properties are configurable based on a nature of the domain and datasets. Any production rule that satisfies any one of the validation properties is a validated rule, whereas any production rule that does not satisfy any one of the validation properties is an invalid rule.

For example, assume the validation properties require that a validated rule satisfies either one of these constraints: (1) a concept is followed by a noun or a pronoun (e.g., (Concept NN NNS)), or (2) a noun or a pronoun is followed by a concept (e.g., (NN NNS Concept)). Based on these assumed validation properties, each production rule of Table 6 that is underlined is an invalid rule, whereas each production rule of Table 6 that is not underlined is a validated rule.

Table 7 below provides some example production rules corresponding to the concept "services" and their probabilities, wherein the production rules are generated using PCFG.

TABLE 7

Phrase -> (NN, Concept): 0.0871369294606
Phrase -> (NN, NN, Concept): 0.045643153527
Phrase -> (Concept, NN): 0.0394190871369
Phrase -> (JJ, Concept): 0.0207468879668
Phrase -> (Concept, IN, NN): 0.0207468879668
Phrase -> (Concept, IN): 0.0186721991701
Phrase -> (Concept, NN, NN): 0.0165975103734
Phrase -> (DT, NN, Concept): 0.0165975103734
Phrase -> (NNS, IN, NN, Concept): 0.0145228215768
Phrase -> (NN, NN, NN, Concept): 0.0145228215768
Phrase -> (Concept, IN, NN, CC): 0.0124481327801

Based on the assumed validation properties described above, each production rule of Table 7 that is underlined is an invalid rule, whereas each production rule of Table 7 that is not underlined is a validated rule.

Table 8 below provides some example production rules corresponding to the concept "service accounts" and their probabilities, wherein the production rules are generated using PCFG.

TABLE 8

Phrase -> (CD, Concept): 0.101449275362
Phrase -> (Concept, TO, DT, NN): 0.0434782608696
Phrase -> (Concept, IN, NN): 0.0289855072464
Phrase -> (Concept, CC, NNS, IN, NN): 0.0289855072464
Phrase -> (Concept, IN): 0.0289855072464
Phrase -> (JJ, Concept): 0.0289855072464
Phrase -> (CD, JJ, Concept): 0.0289855072464
Phrase -> (Concept,): 0.0289855072464
Phrase -> (Concept, NNS, IN, NN, NN, JJ): 0.0289855072464
Phrase -> (Concept, TO, NN, IN): 0.0144927536232
Phrase -> (DT, IN, Concept): 0.0144927536232

Based on the assumed validation properties described above, each production rule of Table 8 that is underlined is an invalid rule, whereas each production rule of Table 8 that is not underlined is a validated rule.

Table 9 below provides some example validated rules corresponding to the concept "service" and their probabilities.

TABLE 9

Phrase -> (NN, Concept): 0.0801687763713
Phrase -> (Concept, NN): 0.0580168776371
Phrase -> (NN, NN, Concept): 0.039029535865
Phrase -> (Concept, NN, NN): 0.0242616033755
Phrase -> (NN, NN, NN, Concept): 0.0147679324895
Phrase -> (DT, NN, Concept): 0.0137130801688
Phrase -> (JJ, NN, Concept): 0.0126582278481
Phrase -> (Concept, NN, IN): 0.0105485232068
Phrase -> (NNS, Concept): 0.00632911392405
Phrase -> (IN, NN, Concept): 0.00527426160338
Phrase -> (Concept, NN, TO): 0.00527426160338

In one embodiment, the discovery and validation unit 430 is configured to filter a list of validated rules corresponding to a concept by: (1) for one or more left rules, if any, of the list, computing a corresponding a sum probability ("left sum probability") representing a sum of probabilities of the left rules, (2) for one or more right rules, if any, of the list, computing a corresponding a sum probability ("right sum probability") representing a sum of probabilities of the right rules, and (3) comparing the left sum probability against the right sum probability, and selecting one of the left rules or the right rules based on the comparison, wherein the selected rules have a higher corresponding sum probability than the non-selected rules, and the selected rules are provided as a filtered list of validated rules corresponding to the concept. If the left sum probability is higher than the right sum probability, the left rules are selected and provided as the filtered list of validated rules; otherwise, the right rules are selected and provided as the filtered list of validated rules instead.

For example, if a left sum probability of all left rules corresponding to the concept "service" is 0.255274261603, and if a right sum probability of all right rules corresponding to the concept "service" is 0.31223628692, the right rules are selected and provided as a filtered list of validated rules corresponding to the concept "service" as the right sum probability is higher.

Table 10 below provides some example right rules included in a filtered list of validated rules corresponding to the concept "service" and their probabilities.

TABLE 10

Phrase -> (NN, Concept): 0.0801687763713
Phrase -> (NN, NN, Concept): 0.039029535865
Phrase -> (NN, NN, NN, Concept): 0.0147679324895
Phrase -> (DT, NN, Concept): 0.0137130801688
Phrase -> (JJ, NN, Concept): 0.0126582278481
Phrase -> (NNS, Concept): 0.00632911392405
Phrase -> (IN, NN, Concept): 0.00527426160338
Phrase -> (NN, NNS, Concept): 0.00527426160338
Phrase -> (NN, NN, NN, NN, NN, Concept): 0.0042194092827
Phrase -> (NN, CC, NN, Concept): 0.0042194092827
Phrase -> (NN, JJ, NN, Concept): 0.00316455696203

In one embodiment, the discovery and validation unit 430 is configured to validate each parse tree corresponding to each concept, and determine a total number (i.e., count) of validated parse trees corresponding to the concept. The total number of validated parse trees is indicative of valid context, and can be used by the discovery and validation unit 430 to filter a list of validated rules corresponding to the concept.

Table 11 below provides some example validated rules corresponding to the concept "services" and their probabilities.

TABLE 11

Phrase -> (NN, Concept): 0.0871369294606
Phrase -> (NN, NN, Concept): 0.045643153527
Phrase -> (Concept, NN): 0.0394190871369
Phrase -> (Concept, NN, NN): 0.0165975103734
Phrase -> (DT, NN, Concept): 0.0165975103734
Phrase -> (NNS, IN, NN, Concept): 0.0145228215768
Phrase -> (NN, NN, NN, Concept): 0.0145228215768
Phrase -> (NNS, Concept): 0.0124481327801
Phrase -> (NNS, NN, Concept): 0.00829875518672
Phrase -> (NN, CC, NN, Concept): 0.00829875518672
Phrase -> (IN, NN, Concept): 0.00622406639004

If a left sum probability of all left rules corresponding to the concept "services" is 0.151452282158, and if a right sum probability of all right rules corresponding to the concept "services" is 0.360995850622, the right rules are selected and provided as a filtered list of validated rules corresponding to the concept "services" as the right sum probability is higher.

Table 12 below provides some example right rules included in a filtered list of validated rules corresponding to the concept "services" and their probabilities.

TABLE 12

Phrase -> (NN, Concept): 0.0871369294606
Phrase -> (NN, NN, Concept): 0.045643153527
Phrase -> (DT, NN, Concept): 0.0165975103734
Phrase -> (NN, NN, NN, Concept): 0.0145228215768
Phrase -> (NNS, IN, NN, Concept): 0.0145228215768
Phrase -> (NNS, Concept): 0.0124481327801
Phrase -> (NN, CC, NN, Concept): 0.00829875518672
Phrase -> (NNS, NN, Concept): 0.00829875518672

TABLE 12-continued

Phrase -> (IN, NN, Concept): 0.00622406639004
Phrase -> (NNS, IN, NN, NN, Concept): 0.00622406639004
Phrase -> (DT, NN, NN, Concept): 0.00622406639004

Table 13 below provides some example validated rules corresponding to the concept "service desk" and their probabilities.

TABLE 13

Phrase -> (Concept, NN, NN, NN): 0.0555555555556
Phrase -> (NN, NN, Concept): 0.0555555555556
Phrase -> (Concept, NN, NN, JJ, NN, NN, TO, NN, NN): 0.0555555555556
Phrase -> (NN, TO, DT, NN, Concept): 0.0277777777778
Phrase -> (Concept, NN): 0.0277777777778
Phrase -> (Concept, NN, NN, CC, NN, NN, NN, NN): 0.0277777777778
Phrase -> (Concept, NN, CD): 0.0277777777778
Phrase -> (Concept, NNS, TO, FW): 0.0277777777778
Phrase -> (Concept, NNS, TO, JJ): 0.0277777777778
Phrase -> (Concept, NN, NN, TO, NN, NN): 0.0277777777778
Phrase -> (Concept, NN, CC, NN): 0.0277777777778

In one embodiment, the system 330 comprises an abstraction and compression unit 440. For each concept (e.g., N-gram concepts from the concept identification unit 410), the abstraction and compression unit 440 is configured to: (1) receive one or more validated rules corresponding to the concept (e.g., a filtered list of validated rules from the discovery and validation unit 430), and (2) generate one or more compressed rules corresponding to the concept based on the one or more validated rules. In one embodiment, the abstraction and compression unit 440 generates the one or more compressed rules by first applying POS tag abstraction to the one or more validated rules, and then applying a string compression technique to the one or more validated rules to compress repeating POS tags.

For example, if the POS tag abstraction comprises abstracting any POS tag that is 'NN', 'NNS', or 'NNPS' as 'Word' (i.e., 'NN':'Word', 'NNS':'Word', and 'NNPS':'Word'), and if a validated rule is defined as "Phrase→(NN, NN, Concept)", the abstraction and compression unit 440 generates a compressed rule defined as "Phrase→(Word, Concept)".

Table 14 below compares example input received by the abstraction and compression unit 440 against example output generated by the abstraction and compression unit 440. The input comprises some right rules included in a filtered list of validated rules corresponding to the concept "service" and their probabilities. The output comprises some compressed rules corresponding to the concept "service", wherein the compressed rules result from applying the POS tag abstraction and the string compression technique described above to the right rules.

TABLE 14

| Input | Output |
|---|---|
| Phrase -> (NN, NN, Concept): 0.039029535865 | Phrase -> Word Concept |
| Phrase -> (NN, NN, NN, Concept): 0.0147679324895 | Phrase -> DT Word Concept |
| Phrase -> (DT, NN, Concept): 0.0137130801688 | Phrase -> Adj Word Concept |
| Phrase -> (JJ, NN, Concept): 0.0126582278481 | Phrase -> IN Word Concept |
| Phrase -> (NNS, Concept): 0.00632911392405 | Phrase -> Word CC Word Concept |
| Phrase -> (IN, NN, Concept): 0.00527426160338 | Phrase -> Word Adj Word Concept |
| Phrase -> (NN, NNS, Concept): 0.00527426160338 | Phrase -> Word IN Word Concept |
| Phrase -> (NN, NN, NN, NN, NN, Concept): 0.0042194092827 | Phrase -> CD Word Concept |
| Phrase -> (NN, CC, NN, Concept): 0.0042194092827 | Phrase -> Adj Word IN Word Concept |
| Phrase -> (NN, JJ, NN, Concept): 0.00316455696203 | |

As shown in Table 14, a total number of compressed rules included in the output is less than a total number of right rules included in the input.

In one embodiment, the system 330 comprises an adapter grammar rules generation unit 450. For each concept (e.g., N-gram concepts from the concept identification unit 410), the adapter grammar rules generation unit 450 is configured to: (1) receive one or more compressed rules corresponding to the concept (e.g., compressed rules from the abstraction and compression unit 440), and (2) apply a semantic mapper to the compressed rules to convert/map the compressed rules to one or more adapter grammar rules corresponding to the concept.

Table 15 below provides an example semantic mapper for converting/mapping compressed rules to adapter grammar rules.

TABLE 15

LEFT: //Entities are on the left side of a concept
{Phrase -> Entities Concept} --> {Phrase -> Entities Concept}
{Phrase -> Adj Entities Concept} --> {Phrase -> AdjPhrase Phrase, AdjPhrase -> Words Adj}
{Phrase -> Entities CC Entities Concept} --> {Phrase -> CCPhrase Phrase, CCPhrase -> Entities CC}
RIGHT: //Entities are on the right side of a concept
{Phrase -> Concept Entities} --> {Phrase -> Concept Entities}
{Phrase -> Concept Entities Adj} --> {Phrase -> Phrase AdjPhrase, AdjPhrase -> Adj Words}
{Phrase -> Concept Entities CC Entities} --> {Phrase -> Phrase CCPhrase, CCPhrase -> CC Entities}

Table 16 below compares example input received by the adapter grammar rules generation unit 450 against example output generated by the adapter grammar rules generation unit 450. The input comprises some compressed rules corresponding to the concept "service". The output comprises some adapter grammar rules corresponding to the concept "service", wherein the adapter grammar rules result from applying the semantic mapper of Table 15 to the compressed rules.

TABLE 16

| Input | Output |
|---|---|
| Phrase -> Word Concept | % non-terminals |
| Phrase -> DT Word Concept | Phrase -> Entities Concept |
| Phrase -> Adj Word Concept | Phrase -> Entities |
| Phrase -> IN Word Concept | Phrase -> Concept |
| Phrase -> Word CC Word Concept | Phrase -> DTPhrase Phrase |
| Phrase -> Word Adj Word Concept | Phrase -> AdjPhrase Phrase |
| Phrase -> Word IN Word Concept | Phrase -> INPhrase Phrase |
| Phrase -> CD Word Concept | Phrase -> CCPhrase Phrase |
| Phrase -> Adj Word IN Word Concept | AdjPhrase -> Words Adj |
| | INPhrase -> Words IN |

TABLE 16-continued

| Input | Output |
|---|---|
| | CCPhrase -> Entities CC |
| | Entities -> Words |
| | Words -> Word Words |
| | Words -> Word |
| | % adapted non-terminals |
| | @ Entities 1500 100 0 |
| | % terminals |
| | Concept -> "service" |
| | Word -> "aptc" |
| | PDT -> "all" |

In one embodiment, for each concept (e.g., N-gram concepts from the concept identification unit 410), the adapter grammar 340 is configured to: (1) receive one or more adapter grammar rules corresponding to the concept (e.g., adapter grammar rules from the adapter grammar rules generation unit 450), (2) receive one or more documents, and (3) learn and extract one or more named entities corresponding to the concept from the documents based on the adapter grammar rules. The adapter grammar 340 learns a structure of the one or more named entities in the documents based on the adapter grammar rules. For example, if the documents comprise one or more IT documents from different technology areas (e.g., database, storage, hardware, etc.), each extracted named entity can be used for application discovery, application analytics, and application automation.

Table 17 below compares example input received by the adapter grammar 340 against example output generated by the adapter grammar 340. The input comprises some adapter grammar rules corresponding to the concept "service". The output comprises some named entities corresponding to the concept "service", wherein the named entities are extracted from one or more documents based on the adapter grammar rules.

TABLE 17

| Input | Output | | |
|---|---|---|---|
| % non-terminals | False | 0.31581 | Phrase -> Entities Concept |
| Phrase -> Entities Concept | False | 0.279915 | Phrase -> Concept |
| Phrase -> Entities | False | 0.201772 | Phrase -> AdjPhrase Phrase |
| Phrase -> Concept | False | 0.137219 | Phrase -> DTPhrase Phrase |
| Phrase -> DTPhrase Phrase | False | 0.0594187 | Phrase -> INPhrase Phrase |
| Phrase -> AdjPhrase Phrase | False | 0.0057241 | Phrase -> CCPhrase Phrase |
| Phrase -> INPhrase Phrase | False | 1.40511e−145 | Phrase -> Entities |
| Phrase -> CCPhrase Phrase | True | 0.0720479 | Entities -> dns |
| AdjPhrase -> Words Adj | True | 0.0603931 | Entities -> mobileiron |
| INPhrase -> Words IN | True | 0.0600692 | Entities -> rvspnp |
| CCPhrase -> Entities CC | True | 0.0596525 | Entities -> dnb |
| Entities -> Words | | | |
| Words -> Word Words | | | |
| Words -> Word | | | |
| % adapted non-terminals | | | |
| @ Entities 1500 100 0 | | | |
| % terminals | | | |
| Concept -> "service" | | | |
| Word -> "aptc" | | | |
| PDT -> "all" | | | |

Table 18 below compares example input received by the adapter grammar 340 against example output generated by the adapter grammar 340. The input comprises some adapter grammar rules corresponding to the concept "services". The output comprises some named entities corresponding to the concept "services", wherein the named entities are extracted from one or more documents based on the adapter grammar rules.

TABLE 18

| Input | Output |
|---|---|
| % non-terminals | False 0.572494 Phrase -> Entities Concept |
| Phrase -> Entities Concept | False 0.146195 Phrase -> Concept |
| INPhrase -> Words IN | False 0.118616 Phrase -> DTPhrase Phrase |
| Phrase -> INPhrase Phrase | False 0.0927203 Phrase -> AdjPhrase Phrase |
| Phrase -> AdjPhrase Phrase | False 0.0469904 Phrase -> INPhrase Phrase |
| AdjPhrase -> Words Adj | False 0.0223955 Phrase -> TOPhrase Phrase |
| TOPhrase -> Words TO | False 4.97483e−168 Phrase -> CCPhrase Phrase |
| TOPhrase -> Phrase | False 4.97483e−168 Phrase -> Entities |
| CCPhrase -> Entities CC | True 0.0462266 Entities -> gateway |
| Phrase -> CCPhrase Phrase | True 0.0446674 Entities -> nextgen paymentplatform |
| DTPhrase -> Words DT | True 0.0279947 Entities -> nd |
| Phrase -> DTPhrase Phrase | True 0.0267293 Entities -> web |
| CDPhrase Phrase | True 0.0252719 Entities -> web systems |
| CDPhrase -> Words CD | |
| RBPhrase -> Words RB | |
| Phrase -> CDPhrase Phrase | |
| Entities -> Words | |
| Words -> Word Words | |
| Words -> Word | |
| % adapted non-terminals | |
| @ Entities 1500 100 0 | |
| % terminals | |
| Concept -> "services" | |
| PDT -> "all" | |
| Entities -> "mpp3" | |

Table 19 below compares example input received by the adapter grammar 340 against example output generated by the adapter grammar 340. The input comprises some adapter grammar rules corresponding to the concept "service desk". The output comprises some named entities corresponding to the concept "service desk", wherein the named entities are extracted from one or more documents based on the adapter grammar rules.

TABLE 19

| Input | Output |
|---|---|
| % non-terminals | False 0.0777064 Phrase -> Concept Entities |
| Phrase -> Concept Entities | False 0.0777064 Phrase -> Entities |
| Phrase -> Entities | False 0.0777064 Phrase -> Concept |

TABLE 19-continued

| Input | | | Output |
|---|---|---|---|
| Phrase -> Concept | True | 0.00558664 | Entities -> service desk technician bryan macario |
| % adapted non-terminals | True | 0.00553105 | Entities -> service desk analyst |
| A Entities 1500 100 0 | True | 0.00547602 | Entities -> service desk |
| Entities -> Words | True | 0.00542153 | Entities -> service desk technician umar siddiqui |
| Words -> Word Words | | | |
| Words -> Word | | | |
| % terminals | | | |
| Concept -> "service desk" | | | |
| CC -> "and" | | | |
| Word -> "managers" | | | |
| FW -> "ad" | | | |
| Word -> "sccd" | | | |

In one embodiment, the system 330 is configured to receive, as input, a given set of documents from different technology areas, and automatically generate domain-specific adapter grammar rules based on the documents. Specifically, the system 330 identifies, for words included in the documents, corresponding POS tags with the highest probabilities (e.g., via the tags generation unit 400). The POS tags are used to extract common nouns (e.g., words with corresponding POS tags 'NN' or 'NNS') and pronouns (e.g., words with corresponding POS tags 'PRP') from the documents. The system 330 extracts concepts (e.g., N-gram concepts) from the documents based on the common nouns and pronouns (e.g., via the concept identification unit 410). The system 330 extracts phrases (e.g., noun phrases) from the documents based on the concepts (e.g., via the phrase generation unit 420). The system 330 creates validated rules based on the phrases (e.g., via the discovery and validation unit 430), and abstracts and compresses the validated rules (e.g., via the abstraction and compression unit 440) to generate adapter grammar rules (e.g., via the adapter grammar rules generation unit 450). The system 330 provides the adapter grammar rules to the adapter grammar 340 to learn and extract named entities from the documents.

Figure 5:
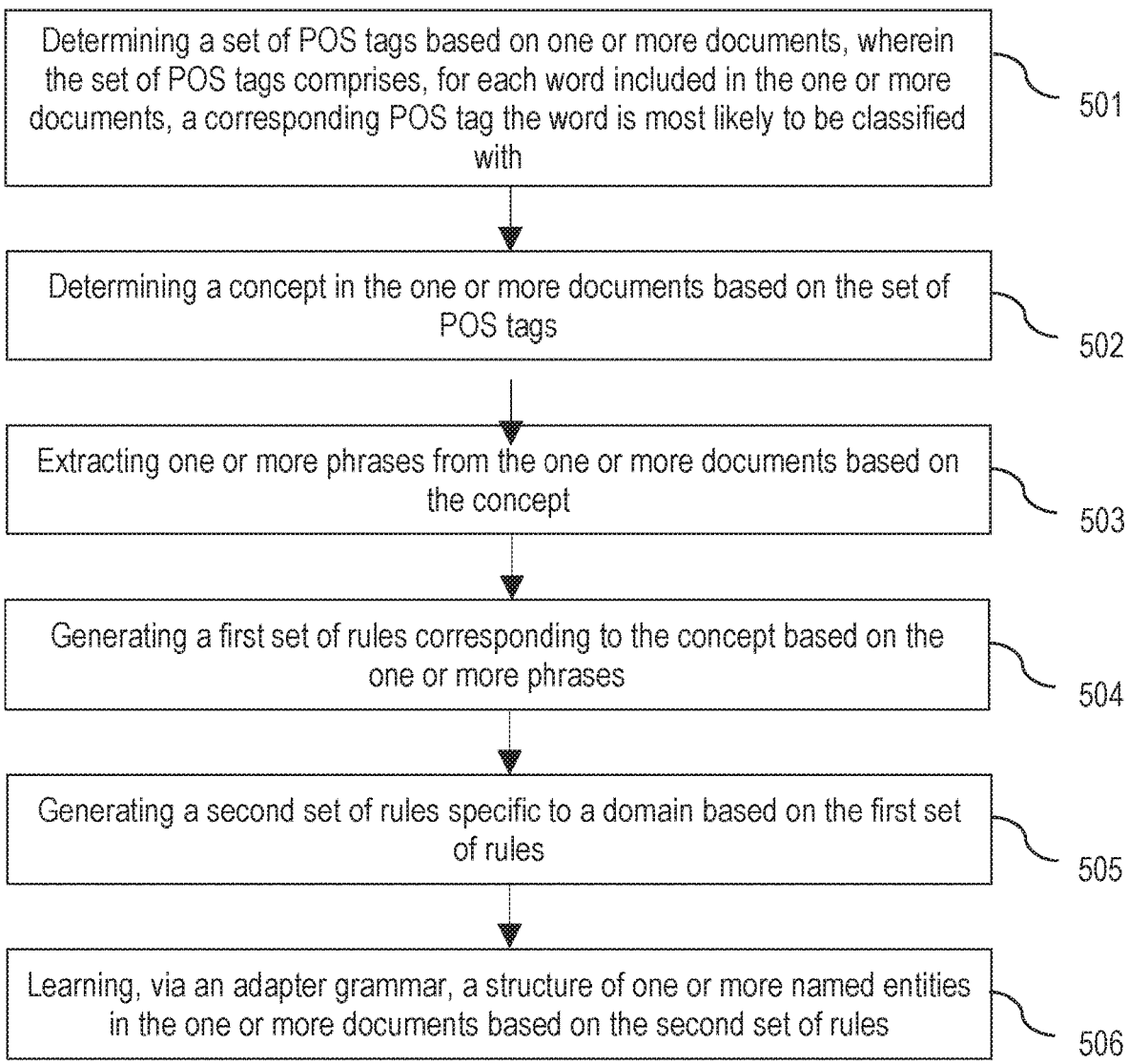
FIG. 5 is a flowchart for an example process for unsupervised adapter grammar rules generation, in accordance with an embodiment of the invention.

FIG. 5 is a flowchart for an example process 500 for unsupervised adapter grammar rules generation, in accordance with an embodiment of the invention. Process block 501 includes determining a set of POS tags based on one or more documents, wherein the set of POS tags comprises, for each word included in the one or more documents, a corresponding POS tag the word is most likely to be classified with. Process block 502 includes determining a concept in the one or more documents based on the set of POS tags. Process block 503 includes extracting one or more phrases from the one or more documents based on the concept. Process block 504 includes generating a first set of rules (e.g., validated and compressed rules) corresponding to the concept based on the one or more phrases. Process block 505 includes generating a second set of rules (e.g., adapter grammar rules) specific to a domain based on the first set of rules. Process block 506 includes learning, via an adapter grammar, a structure of one or more named entities in the one or more documents based on the second set of rules.

In one embodiment, process blocks 501-506 are performed by one or more components of the system 330.

Figure 6:
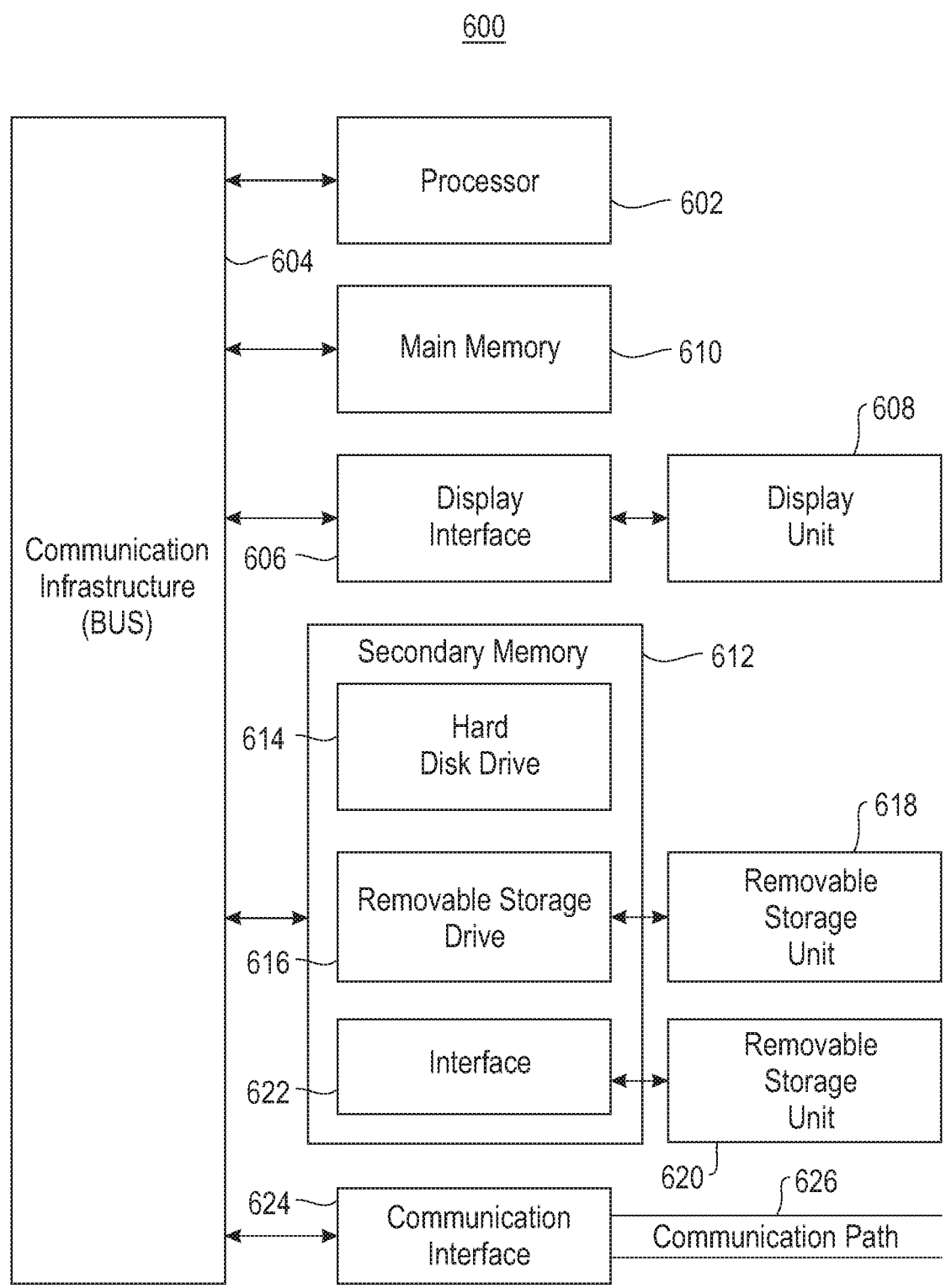
FIG. 6 is a high level block diagram showing an information processing system useful for implementing an embodiment of the invention.

FIG. 6 is a high level block diagram showing an information processing system 600 useful for implementing one embodiment of the invention. The computer system includes one or more processors, such as processor 602. The processor 602 is connected to a communication infrastructure 604 (e.g., a communications bus, cross-over bar, or network).

The computer system can include a display interface 606 that forwards graphics, text, and other data from the voice communication infrastructure 604 (or from a frame buffer not shown) for display on a display unit 608. In one embodiment, the computer system also includes a main memory 610, preferably random access memory (RAM), and also includes a secondary memory 612. In one embodiment, the secondary memory 612 includes, for example, a hard disk drive 614 and/or a removable storage drive 616, representing, for example, a floppy disk drive, a magnetic tape drive, or an optical disk drive. The removable storage drive 616 reads from and/or writes to a removable storage unit 618 in a manner well known to those having ordinary skill in the art. Removable storage unit 618 represents, for example, a floppy disk, a compact disc, a magnetic tape, or an optical disk, etc. which is read by and written to by removable storage drive 616. As will be appreciated, the removable storage unit 618 includes a computer readable medium having stored therein computer software and/or data.

In alternative embodiments, the secondary memory 612 includes other similar means for allowing computer programs or other instructions to be loaded into the computer system. Such means include, for example, a removable storage unit 620 and an interface 622. Examples of such means include a program package and package interface (such as that found in video game devices), a removable memory chip (such as an EPROM, or PROM) and associated socket, and other removable storage units 620 and interfaces 622, which allows software and data to be transferred from the removable storage unit 620 to the computer system.

In one embodiment, the computer system also includes a communication interface 624. Communication interface 624 allows software and data to be transferred between the computer system and external devices. In one embodiment, examples of communication interface 624 include a modem, a network interface (such as an Ethernet card), a communication port, or a PCMCIA slot and card, etc. In one embodiment, software and data transferred via communication interface 624 are in the form of signals which are, for example, electronic, electromagnetic, optical, or other signals capable of being received by communication interface 624. These signals are provided to communication interface 624 via a communication path (i.e., channel) 626. In one embodiment, this communication path 626 carries signals and is implemented using wire or cable, fiber optics, a phone line, a cellular phone link, an RF link, and/or other communication channels.

Embodiments of the invention may be a system, a method, and/or a computer program product at any possible technical detail level of integration. The computer program product may include a computer readable storage medium (or media) having computer readable program instructions thereon for causing a processor to carry out aspects of embodiments of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the invention.

Aspects of embodiments of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that embodiments of the invention provide a system, computer program product, and method for implementing the embodiments of the invention. Embodiments of the invention further provide a non-transitory computer-useable storage medium for implementing the embodiments of the invention. The non-transitory computer-useable storage medium has a computer-readable program, wherein the program upon being processed on a computer causes the computer to implement the steps of embodiments of the invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for entity extraction, comprising:
    determining a set of part-of-speech (POS) tags based on one or more documents;
    determining a concept in the one or more documents based on the set of POS tags;
    extracting one or more phrases from the one or more documents based on the concept;
    generating a first set of rules corresponding to the concept based on the one or more phrases;
    generating a list of validated rules by filtering the first set of rules based on at least one validation property, wherein the at least one validation property requires a validated rule of the list to satisfy at least one constraint;
    generating a second set of rules specific to a domain based on the list of validated rules; and
    learning, via an adapter grammar, a structure of one or more named entities in the one or more documents based on the second set of rules.

2. The method of claim 1, wherein the set of POS tags comprises, for each word included in the one or more documents, a corresponding POS tag the word is most likely to be classified with.

3. The method of claim 1, wherein the one or more documents comprise at least one of an Information Technology (IT) document, a legal document, an intellectual property (IP) document, a healthcare document, a review document, a text publication, or a corporate document.

4. The method of claim 1, wherein the concept is one of a unigram concept or a multigram concept.

5. The method of claim 1, wherein determining the set of POS tags based on the one or more documents comprises:
    learning the set of POS tags using probabilistic context free grammar (PCFG).

6. The method of claim 1, wherein generating the first set of rules corresponding to the concept based on the one or more phrases comprises:
    discovering the first set of rules using probabilistic context free grammar (PCFG);
    validating the first set of rules; and
    compressing the first set of rules.

7. The method of claim 6, wherein compressing the first set of rules comprises:
    applying POS tag abstraction to the first set of rules; and
    applying a string compression technique to the first set of rules to compress repeating POS tags included in at least one rule of the first set of rules.

8. The method of claim 1, wherein generating the second set of rules specific to the domain based on the first set of rules comprises:
    applying a semantic mapper to the first set of rules to convert the first set of rules to the second set of rules.

9. The method of claim 1, further comprising:
    extracting, via the adapter grammar, the one or more named entities from the one or more documents.

10. A system for entity extraction, comprising:
    at least one processor; and
    a non-transitory processor-readable memory device storing instructions that when executed by the at least one processor causes the at least one processor to perform operations including:
        determining a set of part-of-speech (POS) tags based on one or more documents;
        determining a concept in the one or more documents based on the set of POS tags;
        extracting one or more phrases from the one or more documents based on the concept;
        generating a first set of rules corresponding to the concept based on the one or more phrases;
        generating a list of validated rules by filtering the first set of rules based on at least one validation property, wherein the at least one validation property requires a validated rule of the list to satisfy at least one constraint;
        generating a second set of rules specific to a domain based on the list of validated rules; and
        learning, via an adapter grammar, a structure of one or more named entities in the one or more documents based on the second set of rules.

11. The system of claim 10, wherein the set of POS tags comprises, for each word included in the one or more documents, a corresponding POS tag the word is most likely to be classified with.

12. The system of claim 10, wherein the one or more documents comprise at least one of an Information Technology (IT) document, a legal document, an intellectual property (IP) document, a healthcare document, a review document, a text publication, or a corporate document.

13. The system of claim 10, wherein the concept is one of a unigram concept or a multigram concept.

14. The system of claim 10, wherein determining the set of POS tags based on the one or more documents comprises:
    learning the set of POS tags using probabilistic context free grammar (PCFG).

15. The system of claim 10, wherein generating the first set of rules corresponding to the concept based on the one or more phrases comprises:
    discovering the first set of rules using probabilistic context free grammar (PCFG);
    validating the first set of rules; and
    compressing the first set of rules.

16. The system of claim 15, wherein compressing the first set of rules comprises:
    applying POS tag abstraction to the first set of rules; and
    applying a string compression technique to the first set of rules to compress repeating POS tags included in at least one rule of the first set of rules.

17. The system of claim 10, wherein generating the second set of rules specific to the domain based on the first set of rules comprises:
    applying a semantic mapper to the first set of rules to convert the first set of rules to the second set of rules.

18. The system of claim 10, wherein the operations further comprise:
    extracting, via the adapter grammar, the one or more named entities from the one or more documents.

19. A computer program product for entity extraction, the computer program product comprising a non-transitory computer readable storage medium having program instructions embodied therewith, the program instructions executable by a processor to cause the processor to:
    determine, by the processor, a set of part-of-speech (POS) tags based on one or more documents;
    determine, by the processor, a concept in the one or more documents based on the set of POS tags;
    extract, by the processor, one or more phrases from the one or more documents based on the concept;
    generate, by the processor, a first set of rules corresponding to the concept based on the one or more phrases;
    generate, by the processor, a list of validated rules by filtering the first set of rules based on at least one validation property, wherein the at least one validation property requires a validated rule of the list to satisfy at least one constraint;
    generate, by the processor, a second set of rules specific to a domain based on the list of validated rules; and
    learn, by the processor, via an adapter grammar, a structure of one or more named entities in the one or more documents based on the second set of rules.

20. The computer program product of claim 19, wherein the set of POS tags comprises, for each word included in the one or more documents, a corresponding POS tag the word is most likely to be classified with.

21. The computer program product of claim 19, wherein the program instructions are executable by the processor to further cause the processor to:
    extract, by the processor, via the adapter grammar, the one or more named entities from the one or more documents.

* * * * *